US011283736B2

(12) United States Patent
Anderson et al.

(10) Patent No.: US 11,283,736 B2
(45) Date of Patent: *Mar. 22, 2022

(54) CHATBOT ORCHESTRATION

(71) Applicant: INTERNATIONAL BUSINESS MACHINES CORPORATION, Armonk, NY (US)

(72) Inventors: Ryan Anderson, Kensington, CA (US); Anita Govindjee, Ithaca, NY (US); Joseph Kozhaya, Morrisville, NC (US); Javier Torres, Miami, FL (US)

(73) Assignee: International Business Machines Corporation, Armonk, NY (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/879,803

(22) Filed: May 21, 2020

(65) Prior Publication Data
US 2020/0287851 A1 Sep. 10, 2020

Related U.S. Application Data

(63) Continuation of application No. 15/807,678, filed on Nov. 9, 2017, now Pat. No. 10,742,572.

(51) Int. Cl.
*H04L 51/02* (2022.01)
*G10L 15/18* (2013.01)
(Continued)

(52) U.S. Cl.
CPC ............ *H04L 51/02* (2013.01); *G06F 40/205* (2020.01); *G06F 40/279* (2020.01);
(Continued)

(58) Field of Classification Search
None
See application file for complete search history.

(56) References Cited

U.S. PATENT DOCUMENTS 6,754,647 B1 6/2004 Tackett
7,181,492 B2 2/2007 Wen
(Continued)

FOREIGN PATENT DOCUMENTS

WO 2006129967 A1 12/2006

OTHER PUBLICATIONS https://developer.amazon.com/alexa, "Build Skills for Echo Show", printed Jul. 3, 2017, pp. 1-7.
(Continued)

*Primary Examiner* — Uzma Alam
(74) *Attorney, Agent, or Firm* — L. Jeffrey Kelly

(57) ABSTRACT

Utilizing a computing device executing a master chatbot and one or more modular chatbots to respond to one or more chat messages. A computing device executing the master chatbot receives one or more chat messages. The computing device parses the received one or more chat messages to discover an intent and entities contained within the chat messages. A ranking algorithm is employed to rank the master chatbot and a plurality of modular chatbots, the ranking algorithm scoring the master chatbot and the plurality of modular chatbots based upon the intent and entities contained within the one or more chat messages. The master chatbot responds to the chat message if the ranking algorithm rates the master chatbot highest or forwards automatically the one or more chat messages to a ranked modular chatbot for response if the ranking algorithm rates the ranked modular chatbot highest.

18 Claims, 5 Drawing Sheets

(51) Int. Cl.
*G06F 40/205* (2020.01)
*G06F 40/279* (2020.01)
*G06F 40/35* (2020.01)
*G10L 15/22* (2006.01)
*H04L 51/00* (2022.01)
*H04L 67/104* (2022.01)
*G06F 40/284* (2020.01)
*G06F 16/903* (2019.01)
*G06N 20/00* (2019.01)

(52) U.S. Cl.
CPC ............ *G06F 40/284* (2020.01); *G06F 40/35* (2020.01); *G10L 15/1822* (2013.01); *G10L 15/22* (2013.01); *H04L 51/16* (2013.01); *H04L 67/104* (2013.01); *G06F 16/903* (2019.01); *G06N 20/00* (2019.01); *G10L 2015/225* (2013.01)

(56) References Cited

U.S. PATENT DOCUMENTS

| | | | |
|---|---|---|---|
| 7,519,672 B2 | 4/2009 | Boss | |
| 8,103,725 B2 | 1/2012 | Gupta | |
| 8,352,388 B2 | 1/2013 | Estes | |
| 8,463,726 B2 | 6/2013 | Jerram | |
| 8,660,849 B2 | 2/2014 | Gruber | |
| 8,670,979 B2 | 3/2014 | Gruber | |
| 8,892,446 B2* | 11/2014 | Cheyer | G06F 16/3344 704/275 |
| 9,369,410 B2 | 6/2016 | Capper | |
| 10,263,929 B2* | 4/2019 | Dunne | G06F 40/30 |
| 10,742,572 B2* | 8/2020 | Anderson | H04L 51/02 |
| 2009/0164452 A1* | 6/2009 | Yogaratnam | G06F 16/9535 |
| 2010/0254527 A1* | 10/2010 | Addair | H04M 3/5233 379/265.12 |
| 2012/0041903 A1* | 2/2012 | Beilby | G06N 20/00 706/11 |
| 2012/0290662 A1* | 11/2012 | Weber | G06F 16/2465 709/206 |
| 2014/0047049 A1* | 2/2014 | Poston | H04L 51/32 709/206 |
| 2014/0279050 A1 | 9/2014 | Makar | |
| 2017/0091175 A1* | 3/2017 | Kanayama | G06F 40/58 |
| 2017/0243107 A1* | 8/2017 | Jolley | G06N 5/02 |
| 2017/0293834 A1* | 10/2017 | Raison | H04L 51/02 |
| 2018/0089164 A1* | 3/2018 | Iida | G06F 16/90332 |
| 2018/0158457 A1* | 6/2018 | Tanaka | G06F 16/9535 |
| 2018/0253759 A1* | 9/2018 | Deng | G06Q 10/067 |
| 2018/0300414 A1* | 10/2018 | Chen | G06F 3/048 |
| 2018/0341685 A1* | 11/2018 | Indyk | G06F 16/285 |
| 2019/0052584 A1* | 2/2019 | Barve | G06Q 30/016 |
| 2019/0140986 A1 | 5/2019 | Anderson | |

OTHER PUBLICATIONS

Mell et al., "The NIST Definition of Cloud Computing", National Institute of Standards and Technology, Special Publication 800-145, Sep. 2011, pp. 1-7.

IBM: List of IBM Patents or Patent Applications Treated as Related (Appendix P), May 21, 2020, 2 pages.

* cited by examiner

US 11,283,736 B2

CHATBOT ORCHESTRATION

BACKGROUND

The present invention relates generally to the field of chatbots, and more particularly to orchestration of a plurality of chatbots to efficiently respond to messages.

BRIEF SUMMARY

Embodiments of the present invention disclose a method, system, and computer program product for utilizing a computing device executing a master chatbot and one or more modular chatbots to respond to one or more chat messages. The computing device executing the master chatbot receives one or more chat messages to discover an intent of the one or more chat messages and one or more entities contained within the one or more chat messages. A ranking algorithm is employed to rank the master chatbot and a plurality of modular chatbots, the ranking algorithm scoring the master chatbot and the plurality of modular chatbots based upon the intent of the one or more chat messages and the entities contained within the one or more chat messages. The master chatbot responds to the one or more chat messages if the ranking algorithm rates the master chatbot highest or forwards automatically the one or more chat messages to a ranked modular chatbot, the ranked modular chatbot responding to the one or more chat messages received if the ranking algorithm rates the ranked modular chatbot highest.

DETAILED DESCRIPTION

Chatbots are increasingly used to initiate and hold automated conversations with users of websites or software via chat messaging software, obviating the need for humans to respond at least at an initial stage to chat messages presented from users via the chat messaging software. As advances in natural language processing, computational linguistics, artificial intelligence, and machine learning make conversations between humans and chatbots more and more indistinguishable from conversations exclusively between humans, more needs can be satisfied by chatbots without requiring human intervention. As chatbots, however, handle more and more topics, the source code behind them becomes increasingly complicated and time-consuming for a developer to understand to allow a single instance of a chatbot to handle all of a diversity of topics. The CPU time and memory usage necessary to execute a single, complicated chatbot handling all of a diversity of topics is very high, leading to unnecessary resource utilization. A simple chatbot that handles only one or a small number of topics may allow the source code behind it to be much less complicated, as well as less resource intensive to execute. Presented are a method, a system, and a computer program product for using a plurality of chatbots to each handle user messages presented in an efficient manner.

"Chat messages" as discussed herein refer to text-based, vocal, or image-based messages transmitted in real-time via chat messaging software over any sort of network (such as the internet) between a sender and a receiver. All specific types of chat messaging software, as well as all software protocols for sending and receipt of chat messages are contemplated for usage with the presently disclosed invention. In the situation that received chat messages are vocal in nature (i.e., spoken via human voice), speech recognition software serves to parse the vocal messages into text-based messages for further processing as discussed below. Alternately, if transmitted chat messages are text-based in nature, text-to-speech software may serve to convert text-based messages to vocal, as needed.

Figure 1:
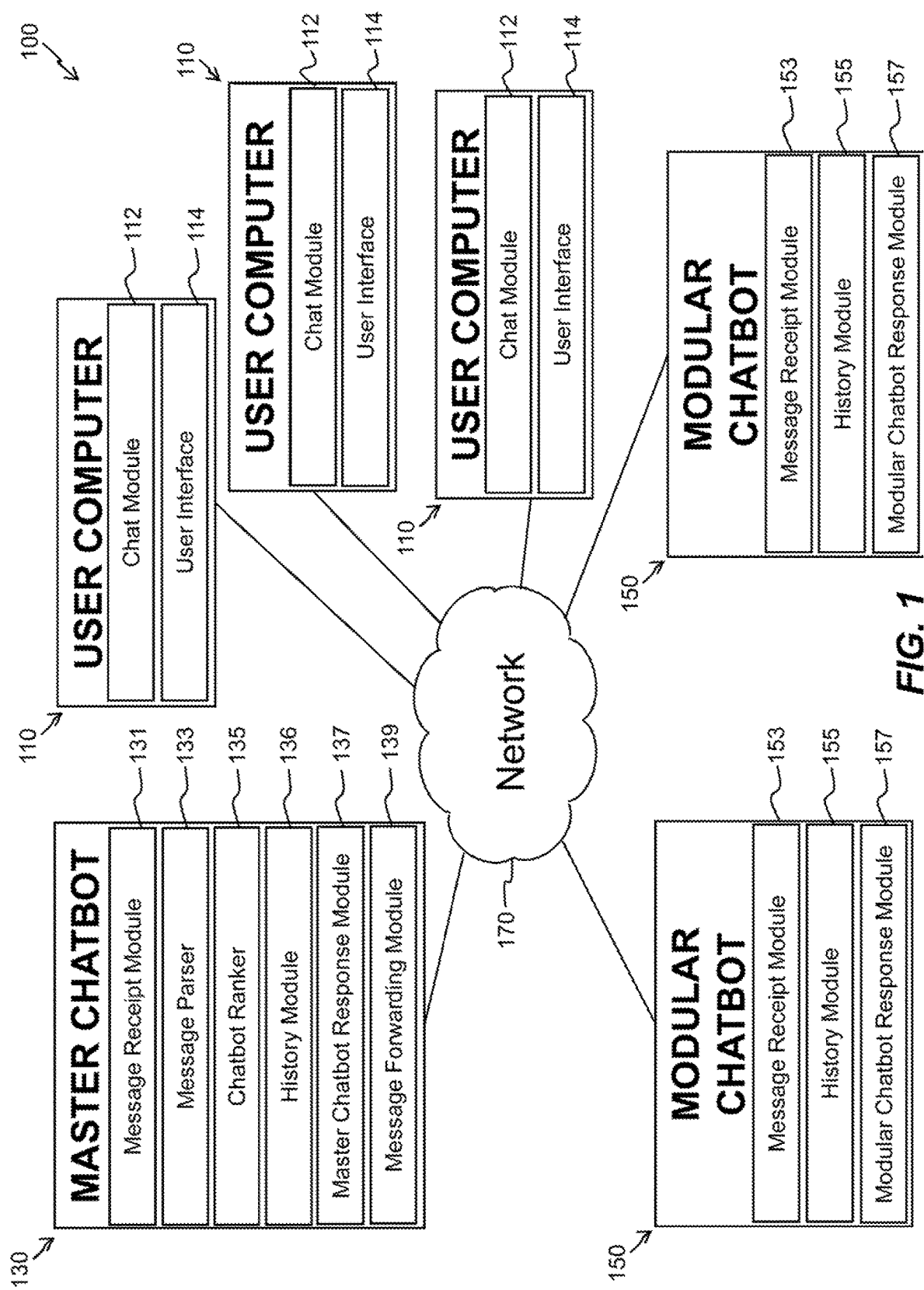
FIG. 1 is a functional block diagram illustrating an environment for orchestration of a plurality of chatbots to efficiently respond to user messages, in accordance with an embodiment of the present invention.

FIG. 1 is a functional block diagram illustrating an environment 100 for orchestration of a plurality of chatbots to efficiently respond to user messages, in accordance with an embodiment of the present invention. In an exemplary embodiment, a master chatbot 130 receives chat messages from user computers 110. The master chatbot 130 parses the chat messages to determine intent of the chat messages and entities contained within the chat messages. The master chatbot 130 either directly responds to the chat messages, if capable, or forwards the chat messages to a modular chatbot 150 for response. The modular chatbot 150 to which a particular chat message is forwarded is determined based upon which modular chatbot 150 is best suited to respond to the chat message, as further discussed below. All of user computers 110, master chatbot 130, and modular chatbots 150 are connected via network 170.

In one embodiment, each of the master chatbot 130 and modular chatbots 150 are substantially identical such as peers. In this embodiment, whichever chatbot of those available via the network 170 receives one or more chat messages functions as the master chatbot 130, and other chatbots function as modular chatbots 150. All chatbots are substantially identical in that each possesses sufficient functionality to act as the master chatbot 130 or a modular chatbot 150, based upon first receipt of chat messages. In this embodiment, if the bot acting as the master chatbot 130 is capable of responding to a received chat message, the master chatbot 130 responds directly. On the other hand, if the master chatbot 130 determines it is incapable of responding to the chat message, the master chatbot 130 issues a request via network 170 for modular chatbots 150 (peers) capable of responding to the chat message. The master chatbot 130 receives responses from the modular chatbots 150 indicating each is capable or not capable of responding to the chat message, and the responses are subsequently validated by the master chatbot 130 that the modular chatbots 150 is actually capable of responding to the chat message successfully. If the modular chatbot 150 is successfully validated, the master chatbot 130 forwards the chat message to the capable modular chatbot 150 for response directly to the user computer 110 which transmitted the one or more chat messages.

In various embodiments, network 170 represents, for example, an internet, a local area network (LAN), a wide area network (WAN) such as the Internet, and includes wired, wireless, or fiber optic connections. In general, network 170 may be any combination of connections and protocols that will support communications between master chatbot 130, user computer 110, and modular chatbots 150 in accordance with an embodiment of the invention.

In various embodiments, master chatbot 130, user computers 110, and modular chatbots 150 may be, for example, a mainframe or a mini computer, a terminal, a laptop, a tablet, a netbook personal computer (PC), a mobile device, a desktop computer, or any other sort of computing device, in accordance with embodiments described herein. Master chatbots 130, user computers 110, and modular chatbot 150 may include internal and external hardware components as depicted and described further in detail with reference to FIG. 3, below. In other embodiments, each of master chatbot 130, user computers 110, and modular chatbots 150 may be implemented in a cloud computing environment, as described in relation to FIGS. 4 and 5, below. In a still further embodiment, some or all of master chatbot 130, user computers 110, and modular chatbots 150 are embodied in physically the same computing device, with all communications between various components made internally.

Master chatbot 130, user computers 110, and modular chatbots 150, in effect, represent any sort of computing device possessing sufficient processing power to execute software to be utilized in orchestration of a plurality of chatbots to efficiently respond to messages, in accordance with an embodiment of the invention. Computing devices associated with master chatbot 130 and modular chatbots 150 may, in responding to user messages, utilize a hosted workload 96 as displayed in connection with FIG. 5 below, and/or perform other tasks as further described herein.

In the exemplary embodiment, each user computer 110 includes a chat module 112 and a user interface 114.

Chat module 112 represents software and/or hardware for a user computer 110 to send and receive chat messages to master chatbot 130. The chat messages may be regarding any topic, or limited to a certain gamut of topics. As discussed above, the chat messages may be text-based in nature, or may be vocal or even images. After transmission of the chat messages by the user computer 110, appropriate responses generated by the master chatbot 130 and modular chatbots 150 are transmitted back to the user computer 110 for display within the chat module 112, allowing a further conversation to take place between the user computer 110 and master chatbot 130 or modular chatbot 150 which responded to the chat message, if desired. As understood by one of skill in the art, chat modules 112 frequently appear as a scrolling display of the series of chat messages between conversation participants, but vocal conversations facilitated by text-to-speech software and speech recognition software are also contemplated herein. Chat module 112 may also be utilized to present to user of user computer 110 which chatbot of master chatbot 130 and modular chatbot 150 will respond to chat messages and return the selection to the master chatbot 130, if this functionality is utilized.

User interface 114 represents an interface, such as a graphical user interface (GUI) for a user at user computer 110 displayed such as via display screen 920 to make selections presented to him or her. The selections are presented by the master chatbot 130 such as by utilization of the graphic-user interface.

In the exemplary embodiment, master chatbot 130 includes a message receipt module 131, a message parser 133, a chatbot ranker 135, a history module 136, a master chatbot response module 137, and a message forwarding module 139.

Message receipt module 131 represents software and/or hardware installed on master chatbot 130 for receipt of chat messages transmitted from user computers 110. Hardware associated with the message receipt module 131 may include network adapter or interface 916, such as displayed in connection with FIG. 3. The chat messages are received by message receipt module 131 in computer-usable form, and further processed by other functionality within master chatbot 130, as discussed.

Message parser 133 represents software for parsing chat messages received by the message receipt module 131 from user computer 110. The message parser 133 is generally responsible for electronically interpreting the subject of the chat messages. Natural language processing performs the necessary interpretations of the chat message into computer-usable form for further use herein. The message parser 133 utilizes natural language processing software to parse and understand each chat message (or multiple chat messages from the same user computer 110 analyzed together). The natural language processing software may be rule-based in nature or based around a machine learning model. The natural language processing software may, in a preferred embodiment, extract intent and/or entities from each chat message (or group of chat messages) for later use. "Intent" includes purposes and/or goals expressed in each chat message or group of chat message's, including seeking an answer to a question or processing a bill payment. "Entities" include both entity types and entity subtypes which categorize a purpose of each chat message or group of chat messages. Examples of entities include, for example anatomy, health condition, person, sport, etc. In the case of vocal messages received from the user computer 110, message parser 133 utilizes speech recognition software to first parse the message into text for further processing, such as via the natural language processing software as discussed above and below.

Message parser 133 may also utilize natural language processing for parsing each chat message or multiple chat messages together for determining message type, message negation, and message sentiment. "Message type" may indicate, for example, that each chat message is a question, statement, definition, or exclamation. "Message negation" may indicate whether each chat message is negative. "Message sentiment" may indicate what sentiment is expressed in each chat message. Message sentiment may be obtained, for example, in the cast of text-based messages from software specialized to detect sentiment from parsed words, and in the case of voice messages from the parsed words themselves, as well as user tone, loudness, urgency, etc.

Chatbot ranker 135 represents software for ranking the master chatbot 130 and/or modular chatbots 150 to determine which is the best, i.e. highest ranked, to respond to the chat messages received by the message receipt module 131. The master chatbot 130 and modular chatbots 150 each have specialty areas each is best at responding to, as well as other considerations including historical record of achieving satisfaction, present availability, and cost of access as further discussed below. That each of master chatbot 130 and modular chatbots 150 have unique specialties which streamlines design and maintenance of source code for each of the master chatbot 130. The master chatbot 130, for example, may be programmed to provide a wide variety of general information regarding a diversity of topics while each modular chatbot 150 may be programmed to provide more detailed information regarding a more limited range of topics, such as automotive knowledge, medical information, product inventory information, etc. with each modular chatbot having different artificial intelligence algorithms to tailored to the topics.

The chatbot ranker 135 utilizes a ranking algorithm in ranking the master chatbot 130 and/or modular chatbots 150 to determine which is the best to respond to the chat message. Each of the master chatbot 130 and modular chatbots 150 have a score calculated by the ranking algorithm. The ranking algorithm utilizes data parsed from the chat messages, including any of the intent, entities, message type, message negation, and/or message sentiment parsed by the message parser 133 in calculating scores by the ranking algorithm. The ranking algorithm compares the data parsed from chat messages with specialty areas for responding to chat messages and/or response history in responding to chat messages for each modular chatbot 150 and master chatbot 130 responded to in the past in determining scores for each of the master chatbot 130 and modular chatbots 150.

The ranking algorithm may alternately or in combination consider other factors in determining which of the master chatbot 130 and modular chatbots 150 is the best to respond to the chat message. The ranking algorithm may also consider a historical record of achieving satisfaction by each of the master chatbot 130 and modular chatbots 150. The historical record of achieving satisfaction by each of the master chatbot 130 and modular chatbots 150 is obtained from prior users regarding the intent of the one or more received chat messages and the entities contained within the one or more chat messages.

The ranking algorithm may consider a high similarity factor between the one or more chat messages and historical chat messages serviced by each of the master chatbot 130 and the modular chatbots 150. The ranking algorithm may consider a high similarity factor regarding the intent of the one or more received chat messages and the entities contained within the one or more chat messages versus a profile for each of the master chatbot 130 and modular chatbots 150.

The ranking algorithm may consider a ranking based upon recommendations from chatbot to chatbot among the master chatbot 130 and all modular chatbots 150 regarding the intent and entities.

The ranking algorithm may also take into consideration present availability of modular chatbot 150, cost of access of each modular chatbot 150, and other considerations when determining which of master chatbot 130 and modular chatbot 150 is best to respond. Each chat message may be analyzed on an individual basis or all chat messages from a single user computer 110 may be analyzed together by the ranking algorithm. The results from the chatbot ranker 135 ranking the master chatbot 130 and/or modular chatbots 150 is utilized in various ways, as discussed.

The chatbot ranker 135 may, in an embodiment of the invention, present a list of top-rated modular chatbots ranked by the ranking algorithm for selection by a user within a timeframe. This offers user of user computer 110 the opportunity to select via the user interface 114 which modular chatbot 150 responds to the chat message. The chatbot ranker 135 may also transmit to the user interface 114 information regarding each modular chatbot 150 which aids the user of the user computer 110 in selecting which modular chatbot 150 to utilize. If the chatbot ranker 135 presents to the user interface 114 a number of chatbots to respond to the chat message, but the user of user computer 110 does not select one within the timeframe, the chatbot ranker 135 may automatically forward the chat message to the top ranked chatbot for response.

History module 136 represents software and a datastore for storing historical data regarding the master chatbot 130. The historical data stored by the history module 136 is utilized by the ranking algorithm of the chatbot ranker 135 to determine scores by the master chatbot 130. Historical data may include specialty areas for responding to chat messages by the master chatbot 130, response history for responding to chat messages by the master chatbot, and similar data as described herein.

Master chatbot response module 137 represents software and/or hardware for directly responding to chat messages received by the message receipt module 131, if the master chatbot 130 is the most appropriate for responding to chat messages received. The master chatbot response module 137 formulates an appropriate response based upon the chat messages parsed by the message parser 133, utilizing natural language processing, and forwards the response to the chat module 112 of the user computer 110 for viewing or listening by the user. The chat message response should answer the user's original question, or present the correct information. Further chat messages from user computer 110 are processed in a similar way, allowing a continuous conversation to be held.

Message forwarding module 139 represents software and/or hardware for forwarding chat messages to modular chatbot 150 for response by the modular chatbot 150, if the master chatbot response module 137 determines one of the modular chatbots 150 is most appropriate to respond to the chat message (based upon the chatbot ranker 135) and the master chatbot response module 137 does not directly respond to the chat message itself. The message forwarding module 139 automatically forwards the one or more chat messages to the most appropriate modular chatbot 150 for response to the user computer 110. Alternately, if the user of user computer 110 has been presented a list of modular chatbots 150 to respond to a chat message, and the user at user interface 114 of user computer 110 has selected a particular modular chatbot 150, the message forwarding module 139 forwards the message to that modular chatbot 150 for response.

In the exemplary embodiment, each modular chatbot 150 includes a message receipt module 153, a history module 155, and a modular chatbot response module 157.

Message receipt module 153 represents software and/or hardware for receipt of forwarded chat messages from the master chatbot 130, allowing the modular chatbot 150 to respond to the chat message, after that chatbot ranker 135 determines, after employing the ranking algorithm, that one of the modular chatbots 150 is the best (i.e. highest ranking, based upon modular chatbot specialty 150 and other areas discussed above) to respond to the chat messages. Alternately, selection of a particular modular chatbot 150 by the user interface 114 at user computer 110 will also cause the chat message to be forwarded to the message receipt module 153 of the particular modular chatbot 150 discussed.

History module 155 represents software and a datastore for storing historical data regarding each modular chatbot 150. The historical data stored by the history module 155 is utilized by the ranking algorithm of the chatbot ranker 135 to determine ranking scores. Historical data stored within the history module 155 of each modular chatbot 150 may include specialty areas for responding to chat messages by the modular chatbot 150, response history for responding to chat messages by the modular chatbot 150, and similar data.

Modular chatbot response module 157 represents software and/or hardware for responding to chat messages forwarded to the modular chatbot 150. If a particular modular chatbot 150 is selected by the ranking algorithm or by the user interface 114 for responding to a chat message, the modular chatbot 150 formulates an appropriate response, considering information parsed from the chat message by the message parser 133 utilizing natural language processing. The appropriate response is transmitted via text or voice to the user computer 110. The chat module 112 of the user computer 110 may be utilized to further continue the chat conversation.

Figure 2:
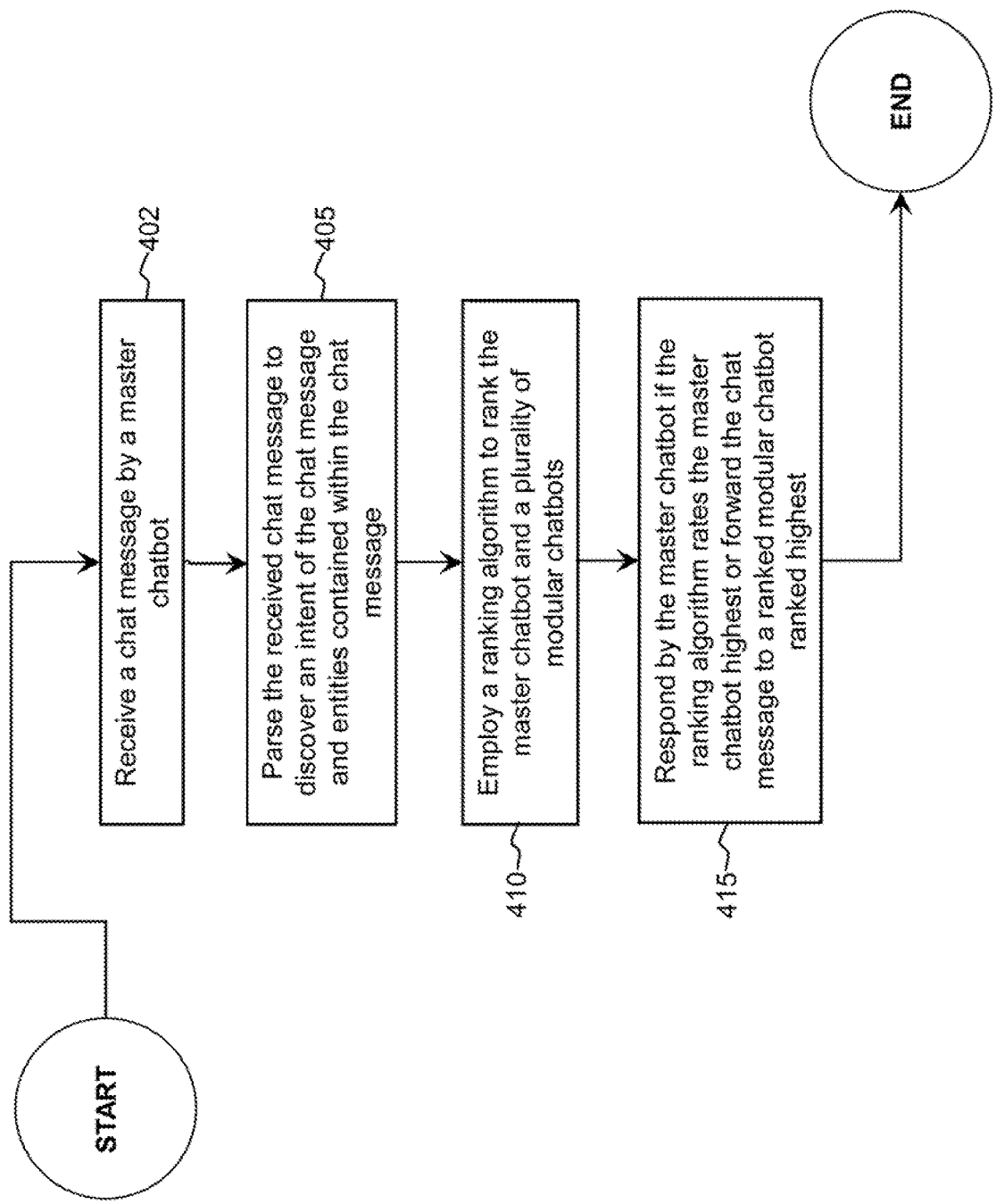
FIG. 2 is a flowchart depicting operation steps that a hardware component, multiple hardware components, and/or a hardware appliance may execute, in accordance with an embodiment of the invention.

FIG. 2 is a flowchart depicting operation steps that a hardware component, multiple hardware components, and/or a hardware appliance may execute, in accordance with an embodiment of the invention. At step 402, a chat message is received by the message receipt module 131 of master chatbot 130 from chat module 112 of user computer 110. As discussed, the chat message may be vocal, text-based, or image-based. At step 405, the chat message is parsed by the message parser 133 to discover an intent of the chat message. The message parser 133 may parse the chat message to discover an intent of the chat message and entities contained within the chat message, or parsed in other ways discussed herein. At step 410, the chatbot ranker 135 utilizes a ranking algorithm to rank the master chatbot 130 and modular chatbots 150. At step 415, the master chatbot 130 responds to the message if the ranking algorithm rates the master chatbot 130 highest, or forwards the message to a ranked modular chatbot 150 ranked highest.

Figure 3:
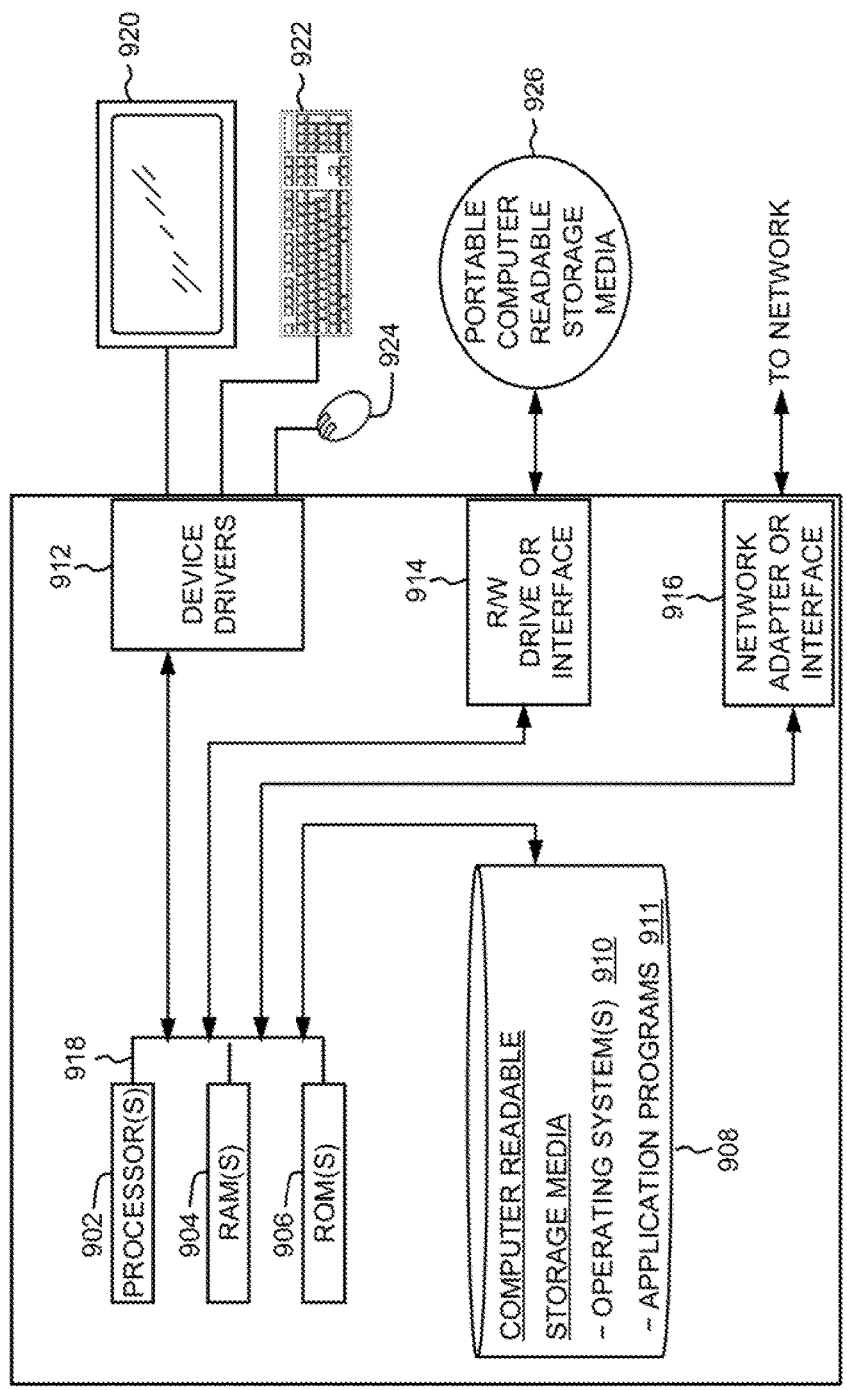
FIG. 3 depicts a block diagram of components of user computer, master chatbot, and modular chatbot of FIG. 1, in accordance with an embodiment of the present invention.

FIG. 3 depicts a block diagram of components of master chatbot 130, user computer 110 and modular chatbot 150 in the environment 100 for orchestration of a plurality of chatbots to efficiently respond to user messages, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Master chatbot 130, user computer 110 and modular chatbot 150 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the environment 100 for orchestration of a plurality of chatbots to efficiently respond to user messages, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Master chatbot 130, user computer 110, and modular chatbot 150 may also include a R/W drive or interface 914 to read from and write to one or more portable computer readable storage media 926. Application programs 911 on master chatbot 130, user computer 110, and modular chatbot 150 may be stored on one or more of the portable computer readable storage media 926, read via the respective R/W drive or interface 914 and loaded into the respective computer readable storage media 908.

Master chatbot 130, user computer 110, and modular chatbot 150 may also include a network adapter or interface 916, such as a TCP/IP adapter card or wireless communication adapter (such as a 4G wireless communication adapter using OFDMA technology). Application programs 911 on master chatbot 130, user computer 110, and modular chatbot 150 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Master chatbot 130, user computer 110, and modular chatbot 150 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a method, computer program product, and/or computer system at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, computer program products, and apparatus (systems) according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of method, system, and computer program product according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
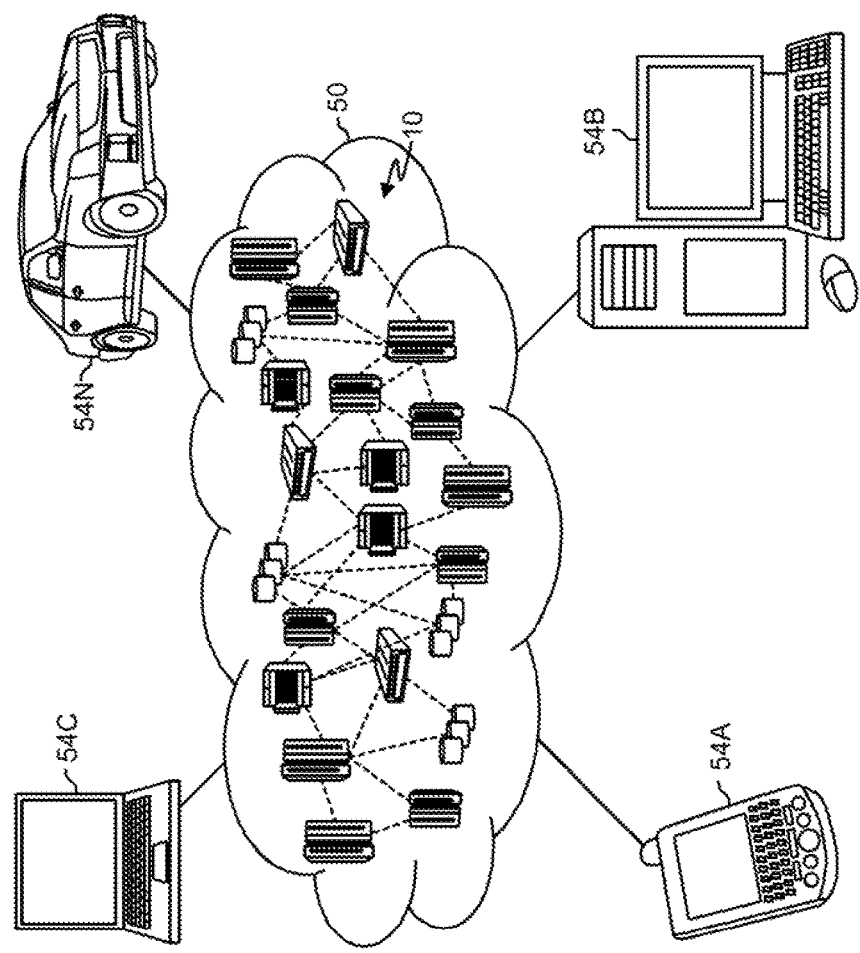
FIG. 4 depicts a cloud computing environment, in accordance with an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
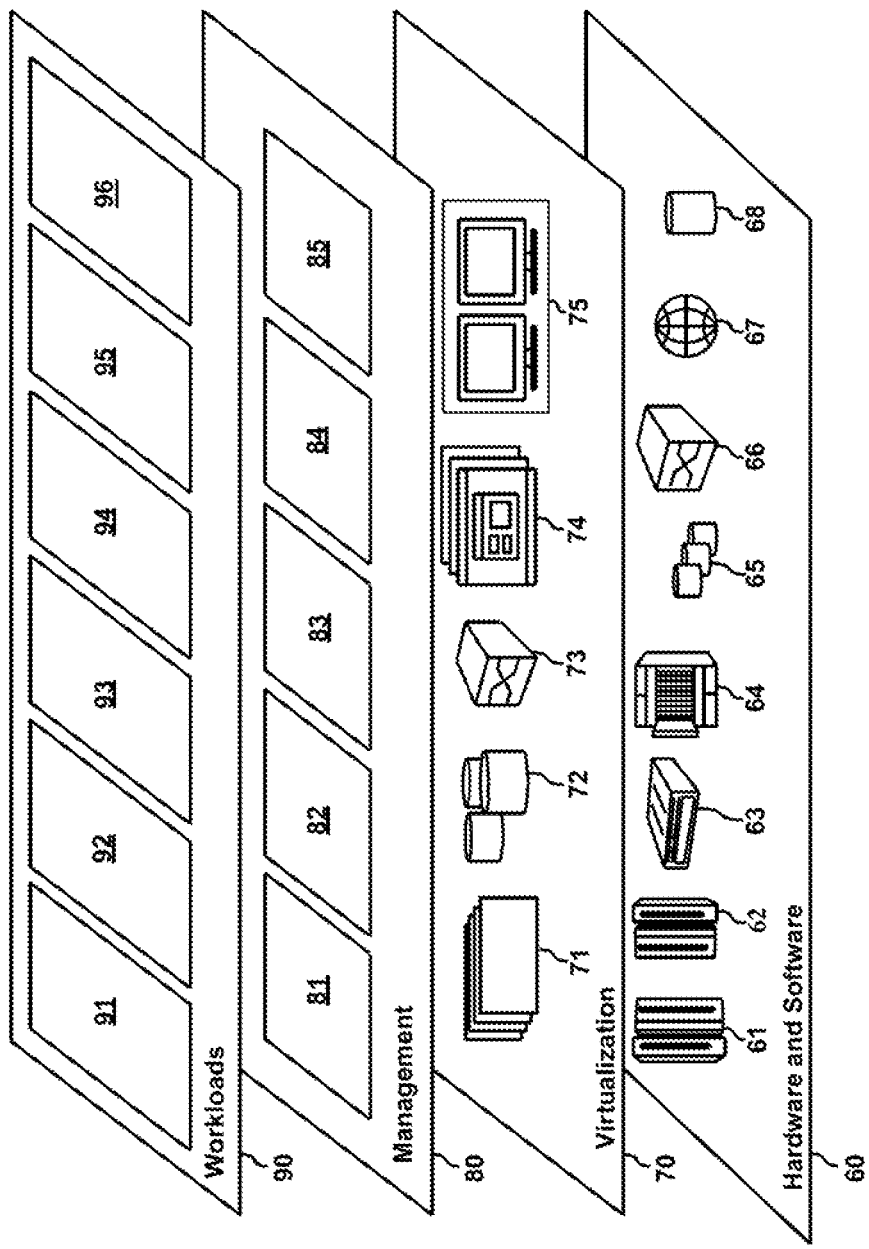
FIG. 5 depicts abstraction model layers, in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and the environment 100 for orchestration of a plurality of chatbots to efficiently respond to user messages.

Based on the foregoing, a method, system, and computer program product have been disclosed. However, numerous modifications and substitutions can be made without deviating from the scope of the present invention. Therefore, the present invention has been disclosed by way of example and not limitation.

What is claimed is:

1. A computer program product for utilizing a computing device executing chatbots to initiate and hold a conversation in chat messaging software between the computing device and a user of a website, the chatbots comprise a master chatbot and a plurality of modular chatbots, the computer program product comprising:
   one or more computer-readable storage media and program instructions stored on the one or more computer-readable storage media, the program instructions comprising:
   program instructions to receive, by the computing device, one or more chat messages from the user in the chat messaging software;
   program instructions to parse, by the computing device, the received one or more chat messages to discover an intent of the one or more chat messages and one or more entities contained within the one or more chat messages;
   program instructions to employ a ranking algorithm to rank the chatbots, the ranking algorithm scoring the chatbots based upon the intent of the one or more chat messages and the one or more entities contained within the one or more chat messages;
   program instructions to present a list of top-ranked chatbots from the ranked chatbots for selection by the user within a timeframe;
   program instructions to determine a user selected chatbot among the list of top-ranked chatbots, and program instructions to forward the one or more chat messages to the user selected chatbot;
   in response to the timeframe expiring, program instructions to select the highest ranked chatbot among the list of top-ranked chatbot among the list of top-ranked chatbots, and program instructions to forward automatically the one or more chat messages to the selected highest ranked chatbot; and
   program instructions to respond, by either the user selected chatbot or the selected highest ranked chatbot, to the one or more chat messages.

2. The computer program product of claim 1, wherein the top-ranked chatbot is ranked by the ranking algorithm.

3. The computer program product of claim 1, wherein the ranking algorithm ranks the master chatbot and the plurality of modular chatbots based upon the intent of the one or more chat messages and the one or more entities contained within the one or more chat messages and according to one or more of the following:
   a historical record of achieving satisfaction by each of the master chatbot and the plurality of modular chatbots from prior users regarding the intent of the one or more received chat messages and the one or more entities contained within the one or more chat messages;
   a high similarity factor between the one or more chat messages and historical chat messages serviced by each of the master chatbot and the plurality of modular chatbots;
   a high similarity factor regarding the intent of the one or more received chat messages and the one or more entities contained within the one or more chat messages versus a profile for each of the master chatbot and the plurality of modular chatbots; and
   a ranking based upon recommendations from chatbot to chatbot among the master chatbot and the plurality of modular chatbots regarding the intent and one or more entities.

4. The computer program product of claim 1, wherein the master chatbot and the plurality of modular chatbots function as peers in a peer-to-peer network.

5. The computer program product of claim 1, wherein the one or more chat messages comprise selectively one of the following: a text message, a vocal message, and an image.

6. A computer program product of utilizing a computing device executing a master chatbot and a plurality of modular chatbots to initiate and hold a conversation in chat messaging software between the computing device and a user of a website, the computer program product comprising:
   one or more computer-readable storage media and program instructions stored on the one or more computer-readable storage media, the program instructions comprising:
   program instructions to receive by a computing device executing a master chatbot one or more chat messages from the user in the chat messaging software;
   program instructions to parse by the computing device the received one or more chat messages to discover an intent of the one or more chat messages and one or more entities contained within the one or more chat messages;
   program instructions to employ a ranking algorithm to rank the master chatbot and the plurality of modular chatbots, the ranking algorithm scoring the master chatbot and the plurality of modular chatbots based upon the intent of the one or more chat messages and the one or more entities contained within the one or more chat messages, wherein the master chatbot and the plurality of modular chatbots function as peers in a peer-to-peer network;
   after determining that the master chatbot is not capable of responding to the one or more received chat messages, program instructions to perform the following steps of:
   program instructions to issue by the master chatbot a request on the peer-to-peer network for a subset of the plurality of modular chatbots capable of serving the intent of the one or more received chat messages and the one or more entities contained within the one or more chat messages,
   program instructions to receive responses from the subset of the plurality of modular chatbots indicating they are capable, and
   program instructions to validate one or more of the subset of the plurality of modular chatbots are capable of serving the intent of the one or more received chat messages and the one or more entities contained within the one or more chat messages;
   program instructions to determine a top-ranked chatbot among the master chatbot and the plurality of modular chatbots; and
   program instructions to respond in the chat messaging software by the top-ranked chatbot to the one or more chat messages.

7. The computer program product of claim 6, wherein the top-ranked chatbot is ranked by the ranking algorithm.

8. The computer program product of claim 6, wherein the ranking algorithm ranks the master chatbot and the plurality of modular chatbots based upon the intent of the one or more chat messages and one or more entities contained within the one or more chat messages and according to one or more of the following:
- a historical record of achieving satisfaction by each of the master chatbot and the plurality of modular chatbots from prior users regarding the intent of the one or more received chat messages and the one or more entities contained within the one or more chat messages;
- a high similarity factor between the one or more chat messages and historical chat messages serviced by each of the master chatbot and the plurality of modular chatbots;
- a high similarity factor regarding the intent of the one or more received chat messages and the one or more entities contained within the one or more chat messages versus a profile for each of the master chatbot and the plurality of modular chatbots; and
- a ranking based upon recommendations from chatbot to chatbot among the master chatbot and the plurality of modular chatbots regarding the intent and one or more entities.

9. The computer program product of claim 6, wherein the one or more chat messages comprise selectively one of the following: a text message, a vocal message, and an image.

10. A computer system for utilizing a computing device executing chatbots to initiate and hold a conversation in chat messaging software between the computing device and a user of a website, the chatbots comprise a master chatbot and a plurality of modular chatbots, the computer system comprising:
- one or more computer processors, one or more computer-readable storage media, and program instructions stored on the one or more of the computer-readable storage media for execution by at least one of the one or more processors, the program instructions comprising:
- program instructions to receive, by the computing device, one or more chat messages from the user in the chat messaging software;
- program instructions to parse, by the computing device, the received one or more chat messages to discover an intent of the one or more chat messages and one or more entities contained within the one or more chat messages;
- program instructions to employ a ranking algorithm to rank the chatbots, the ranking algorithm scoring the chatbots based upon the intent of the one or more chat messages and the one or more entities contained within the one or more chat messages;
- program instructions to present a list of top-ranked chatbots from the ranked chatbots for selection by the user within a timeframe;
- program instructions to determine a user selected chatbot among the list of top-ranked chatbots, and program instructions to forward the one or more chat messages to the user selected chatbot;
- in response to the timeframe expiring, program instructions to select the highest ranked chatbot among the list of top-ranked chatbot among the list of top-ranked chatbots, and program instructions to forward automatically the one or more chat messages to the selected highest ranked chatbot; and
- program instructions to respond, by either the user selected chatbot or the selected highest ranked chatbot, to the one or more chat messages.

11. The computer system of claim 10, wherein the top-ranked chatbot is ranked by the ranking algorithm.

12. The computer system of claim 10, wherein the ranking algorithm ranks the master chatbot and the plurality of modular chatbots based upon the intent of the one or more chat messages and the one or more entities contained within the one or more chat messages and according to one or more of the following:
- a historical record of achieving satisfaction by each of the master chatbot and the plurality of modular chatbots from prior users regarding the intent of the one or more received chat messages and the one or more entities contained within the one or more chat messages;
- a high similarity factor between the one or more chat messages and historical chat messages serviced by each of the master chatbot and the plurality of modular chatbots;
- a high similarity factor regarding the intent of the one or more received chat messages and the one or more entities contained within the one or more chat messages versus a profile for each of the master chatbot and the plurality of modular chatbots; and
- a ranking based upon recommendations from chatbot to chatbot among the master chatbot and the plurality of modular chatbots regarding the intent and one or more entities.

13. The computer system of claim 10, wherein the master chatbot and the plurality of modular chatbots function as peers in a peer-to-peer network.

14. The computer system of claim 10, wherein the one or more chat messages comprise selectively one of the following: a text message, a vocal message, and an image.

15. A computer system for utilizing a computing device executing chatbots to initiate and hold a conversation in chat messaging software between the computing device and a user of a website, the chatbots comprise a master chatbot and a plurality of modular chatbots, the computer system comprising:
- one or more computer processors, one or more computer-readable storage media, and program instructions stored on the one or more of the computer-readable storage media for execution by at least one of the one or more processors, the program instructions comprising:

program instructions to receive by a computing device executing a master chatbot one or more chat messages from the user in the chat messaging software;
- program instructions to parse by the computing device the received one or more chat messages to discover an intent of the one or more chat messages and one or more entities contained within the one or more chat messages;
- program instructions to employ a ranking algorithm to rank the master chatbot and the plurality of modular chatbots, the ranking algorithm scoring the master chatbot and the plurality of modular chatbots based upon the intent of the one or more chat messages and the one or more entities contained within the one or more chat messages, wherein the master chatbot and the plurality of modular chatbots function as peers in a peer-to-peer network;
- after determining that the master chatbot is not capable of responding to the one or more received chat messages, program instructions to perform the following steps of:

program instructions to issue by the master chatbot a request on the peer-to-peer network for a subset of the plurality of modular chatbots capable of serving the intent of the one or more received chat messages and the one or more entities contained within the one or more chat messages, program instructions to receive responses from the subset of the plurality of modular chatbots indicating they are capable, and program instructions to validate one or more of the subset of the plurality of modular chatbots are capable of serving the intent of the one or more received chat messages and the one or more entities contained within the one or more chat messages;

program instructions to determine a top-ranked chatbot among the master chatbot and the plurality of modular chatbots; and program instructions to respond in the chat messaging software by the top-ranked chatbot to the one or more chat messages.

16. The computer system of claim 15, wherein the top-ranked chatbot is ranked by the ranking algorithm.

17. The computer system of claim 15, wherein the ranking algorithm ranks the master chatbot and the plurality of modular chatbots based upon the intent of the one or more chat messages and one or more entities contained within the one or more chat messages and according to one or more of the following:

- a historical record of achieving satisfaction by each of the master chatbot and the plurality of modular chatbots from prior users regarding the intent of the one or more received chat messages and the one or more entities contained within the one or more chat messages;
- a high similarity factor between the one or more chat messages and historical chat messages serviced by each of the master chatbot and the plurality of modular chatbots;
- a high similarity factor regarding the intent of the one or more received chat messages and the one or more entities contained within the one or more chat messages versus a profile for each of the master chatbot and the plurality of modular chatbots; and
- a ranking based upon recommendations from chatbot to chatbot among the master chatbot and the plurality of modular chatbots regarding the intent and one or more entities.

18. The computer system of claim 15, wherein the one or more chat messages comprise selectively one of the following: a text message, a vocal message, and an image.

* * * * *